US012417172B2

(12) United States Patent
Moriyasu et al.

(10) Patent No.: US 12,417,172 B2
(45) Date of Patent: Sep. 16, 2025

(54) MEMORY SYSTEM

(71) Applicant: Kioxia Corporation, Tokyo (JP)

(72) Inventors: Noriyuki Moriyasu, Kawasaki Kanagawa (JP); Masaru Ogawa, Ebina Kanagawa (JP); Kenji Sakaue, Yokohama Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 43 days.

(21) Appl. No.: 18/454,265

(22) Filed: Aug. 23, 2023

(65) Prior Publication Data

US 2024/0193080 A1   Jun. 13, 2024

(30) Foreign Application Priority Data

Dec. 12, 2022   (JP) ................ 2022-197919

(51) Int. Cl.
*G06F 12/00* (2006.01)
*G06F 12/02* (2006.01)
(52) U.S. Cl.
CPC .. *G06F 12/0246* (2013.01); *G06F 2212/7203* (2013.01)
(58) Field of Classification Search
CPC ............. G06F 12/0246; G06F 2212/7203
See application file for complete search history.

(56) References Cited

U.S. PATENT DOCUMENTS

| 8,555,095 | B2 | 10/2013 | Byom et al. |
| 9,093,160 | B1* | 7/2015 | Ellis ................. G11C 16/32 |
| 10,276,221 | B2 | 4/2019 | Sugahara et al. |
| 11,507,310 | B2 | 11/2022 | Kim et al. |
| 2010/0061152 | A1* | 3/2010 | De Caro ............ G11C 7/22 |
| | | | 365/194 |
| 2021/0064294 | A1 | 3/2021 | Kim et al. |

FOREIGN PATENT DOCUMENTS

| JP | 5722728 B2 | 5/2015 |
| JP | 2018-156480 A | 10/2018 |

* cited by examiner

*Primary Examiner* — Jane W Benner
(74) *Attorney, Agent, or Firm* — Foley & Lardner LLP

(57) ABSTRACT

A memory system including a plurality of nonvolatile memories and a controller. The controller is connected to the plurality of nonvolatile memories via a plurality of channels. The nonvolatile memory stores a first parameter indicating a delay value. The controller acquires the first parameter from the nonvolatile memory. The controller delays start timing of data transfer to the nonvolatile memory via a channel among the plurality of channels by a delay value according to the first parameter.

16 Claims, 10 Drawing Sheets

MEMORY SYSTEM

CROSS-REFERENCE TO RELATED APPLICATION

This application is based upon and claims the benefit of priority from Japanese Patent Application No. 2022-197919, filed Dec. 12, 2022, the entire contents of which are incorporated herein by reference.

FIELD

Embodiments described herein relate generally to a memory system.

BACKGROUND

In a memory system in which a controller is connected to a plurality of nonvolatile memories via a plurality of channels, data transfer from the controller to each nonvolatile memory is performed via the channels. At this time, it is desired that data transfer to a plurality of nonvolatile memories is appropriately performed.

DETAILED DESCRIPTION

Embodiments provide a memory system capable of appropriately transferring data to a plurality of nonvolatile memories.

In general, according to at least one embodiment, a memory system including a plurality of nonvolatile memories and a controller is provided. The controller is connected to the plurality of nonvolatile memories via a plurality of channels. The nonvolatile memory stores a first parameter indicating a delay value. The controller acquires the first parameter from the nonvolatile memory. The controller delays start timing of the data transfer to the nonvolatile memory via the channels among the plurality of channels by a delay value according to the first parameter.

In the following, the memory system according to embodiments will be described in detail with reference to the accompanying drawings. It is noted that the present disclosure is not limited by these embodiments.

First Embodiment

In a memory system according to at least one embodiment, a controller is connected to a plurality of nonvolatile memories via a plurality of channels, and data transfer is performed from the controller to each nonvolatile memory via the channels, but data transfer is devised to be performed appropriately.

Figure 1:
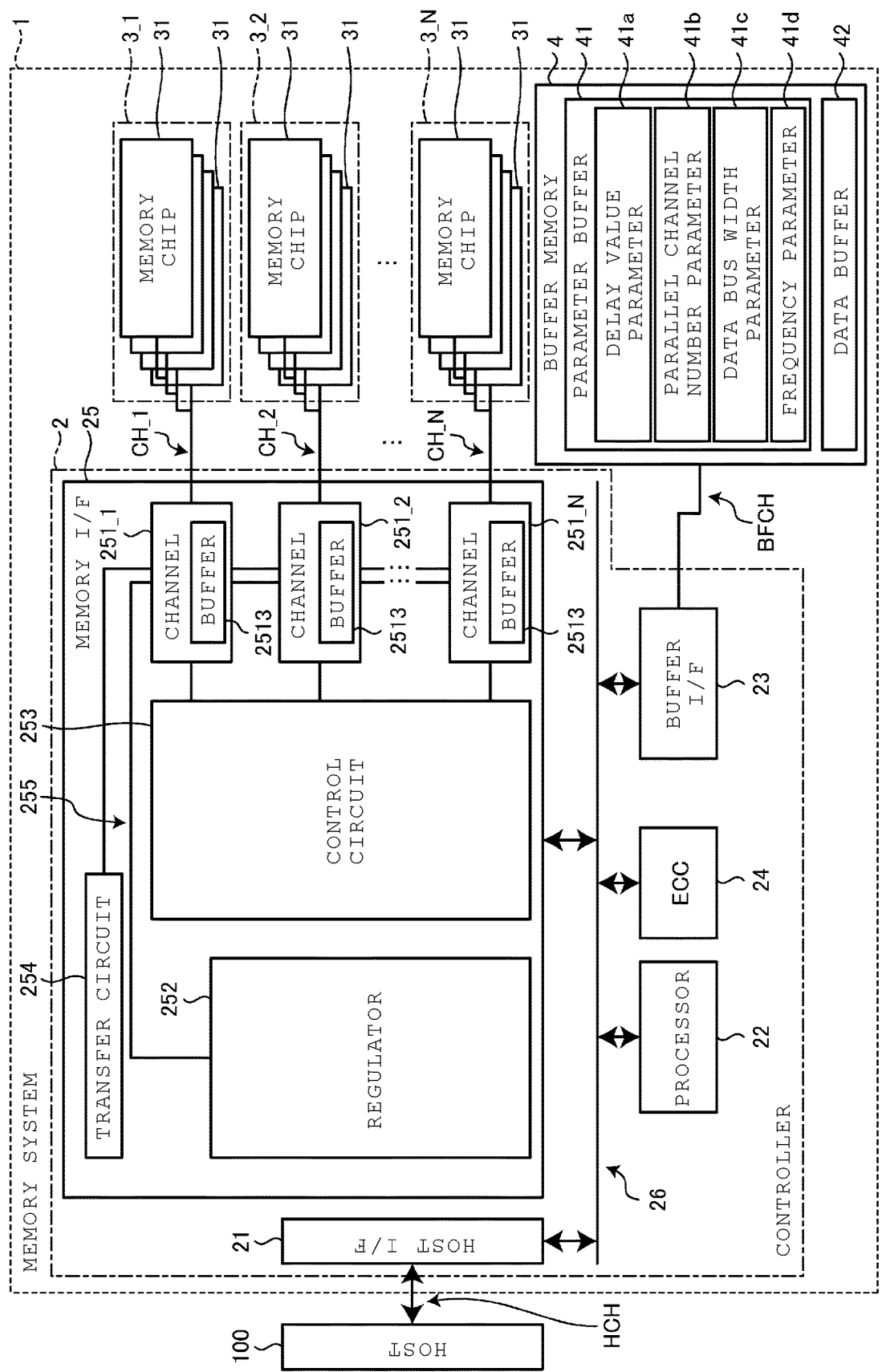
FIG. 1 is a block diagram illustrating a configuration of a memory system according to a first embodiment.

As illustrated in FIG. 1, a memory system 1 is communicably connected to a host 100 via a host channel HCH and can function as a storage medium for the host 100. FIG. 1 is a block diagram illustrating a configuration of the memory system 1. The host 100 may be, for example, an information processing device such as a personal computer, or may be a mobile terminal such as a smart phone. The memory system 1 may be, for example, a storage device such as a solid state drive (SSD), a universal flash storage (UFS), or an embedded multi media card (eMMC), or may be a memory card such as an SD card. The host channel HCH may be, for example, a wired communication path conforming to an SATA standard, a PCIe standard, or the like.

The memory system 1 includes a controller 2, a plurality of nonvolatile memories 3_1 to 3_N (N is an any integer of 2 or more), and a buffer memory 4.

The controller 2 can be connected to the host 100 via the host channel HCH, and can transmit and receive commands, data, and the like to and from the host 100.

The controller 2 is connected to the plurality of nonvolatile memories 3_1 to 3_N via a plurality of channels CH_1 to CH_N, and can transfer commands, data, and the like to and from a nonvolatile memory 3. N is any integer of 2 or more. Each of the plurality of channels CH_1 to CH_N may be, for example, a wired communication path conforming to the SATA standard, the PCIe standard, or the like.

The controller 2 is connected to the buffer memory 4 via a buffer channel BFCH, and can temporarily store data, management information, and the like in the buffer memory 4. The buffer channel BFCH may be, for example, a wired communication path conforming to the SATA standard, the PCIe standard, or the like.

Each of the plurality of nonvolatile memories 3_1 to 3_N can store the data, the management information, and the like in a nonvolatile manner. Among storage areas in the nonvolatile memory 3, an area for storing the data is sometimes called a storage area, and an area for storing the management information and the like is sometimes called a management information storage area. The management information includes delay value parameters, which will be described later.

Each nonvolatile memory 3 may be, for example, a NAND flash memory, a resistance random access memory (ReRAM), a phase change RAM (PRAM), a magnetoresistive random access memory (MRAM), or a ferroelectric random access memory (FeRAM). The following description will focus on a case where each nonvolatile memory 3 is the NAND flash memory.

Each nonvolatile memory 3 includes a plurality of memory chips 31. FIG. 1 illustrates a configuration in which each nonvolatile memory 3 includes the four memory chips 31. Inside each memory chip 31, a unit in which data write and data read can be accessed collectively is a physical page. A physical block is configured with the plurality of physical pages and is the smallest access unit in which data can be independently erased. Each physical block has a plurality of memory cells. Each memory cell can store a plurality of bits. In each physical block, when each memory cell of a memory cell group connected to the same word line can store n-bit information, the memory cell group is treated as n physical pages. n is an integer of 1 or more.

The buffer memory 4 is, for example, a volatile memory such as a dynamic random access memory (DRAM) or a static random access memory (SRAM). The buffer memory 4 may be implemented by a register circuit or the like configured with a latch circuit. The buffer memory 4 can temporarily store data, management information, and the like. The buffer memory 4 can be used as a working area used by the controller 2. The buffer memory 4 may temporarily store data related to a write process or a read process, may temporarily store data for an internal process such as garbage collection (compaction), and may temporarily store the management information such as address conversion information. Although the buffer memory 4 is provided outside the controller 2 in this embodiment, the buffer memory 4 may be provided in a control circuit 253 or in the host 100. In addition, the buffer memory 4 is not necessarily a volatile memory, and may be the nonvolatile memory.

The buffer memory 4 includes a parameter buffer 41 and a data buffer 42. Various parameters (for example, a delay value parameter 41a, a parallel channel number parameter 41b, a data bus width parameter 41c, a frequency parameter 41d, and the like, which will be described later) are temporarily stored in the parameter buffer 41 by the controller 2. The controller 2 determines various parameters by performing training, which will be described later, and after that, writes the various parameters in both the parameter buffer 41 and the nonvolatile memory 3. Until the power is turned off, the controller 2 can then read various parameters from the parameter buffer 41 and use various parameters. Various data (for example, write data, read data) are temporarily stored in the data buffer 42 by the controller 2.

The controller 2 comprehensively controls each component of the memory system 1. The controller 2 may be implemented as a controller package including, for example, a system-on-a-chip (SoC).

The controller 2 includes a host interface (host I/F) 21, a processor 22, a buffer interface (buffer I/F) 23, an error correction code (ECC) circuit 24, a memory interface (memory I/F) 25, and a bus 26.

The host interface 21, the processor 22, the buffer interface 23, the ECC circuit 24, and the memory interface 25 are communicatively connected to each other via the bus 26.

The processor 22 comprehensively controls each component of the controller 2. The processor 22 can be implemented as a central processing unit (CPU) or the like. The processor 22 controls the write process for writing data to the nonvolatile memory 3 according to a write command received by the host interface 21. The processor 22 controls the read process for reading data from the nonvolatile memory 3 according to a read command received by the host interface 21.

The buffer interface 23 controls the access to the buffer memory 4 under the control of the processor 22. The buffer interface 23 can transfer the data related to the write process or the read process, the data for the internal process such as garbage collection, the management information such as address conversion information, and the like to and from the buffer memory 4.

The ECC circuit 24 encodes and decodes data for error detection and error correction in the read data. The ECC circuit 24 encodes the data (the write data) to be written to the nonvolatile memory 3. In addition, the ECC circuit 24 decodes the data (the read data) read from the nonvolatile memory 3. The nonvolatile memory 3 performs the error detection and the error correction on the read data by the decoding. The ECC circuit 24 notifies the processor 22 of the error correction failure when the error correction fails.

Any algorithm using a reed-solomon (RS) code, a bose-chaudhuri-hocquenghem (BCH) code, a low-density parity check (LDPC) code, or the like can be applied to an encoding and decoding algorithm by the ECC circuit 24.

The memory interface 25 performs interface operations with respect to the nonvolatile memory 3 under the control of the processor 22. The memory interface 25 can transfer the data related to the write process or the read process, the data of the internal process such as garbage collection, the management information such as address conversion information, and the like to and from the nonvolatile memory 3.

The memory interface 25 includes a plurality of channel interfaces 251_1 to 251_N, a regulator 252, a control circuit 253, and a transfer circuit 254.

The regulator 252 is connected between the power supply circuit (not illustrated) in the host 100 or the memory system 1 and the plurality of channel interfaces 251_1 to 251_N. The regulator 252 is connected in parallel to the plurality of channel interfaces 251_1 to 251_N via a power supply line 255. The regulator 252 receives power from the power supply circuit (not illustrated) in the host 100 or the memory system 1. The regulator 252 generates an internal power supply voltage of the memory system 1 according to the power. The regulator 252 supplies a power supply current corresponding to the internal power supply voltage to the plurality of channel interfaces 251_1 to 251_N while controlling the internal power supply voltage of the memory system 1 so as to be equal to a target value. The target value is a voltage value necessary for an electronic component to which the power supply current is supplied by the regulator 252 to operate.

The regulator 252 is set with a maximum value which can cope with a speed of current change. The speed of current change is hereinafter referred to as a current change rate. The current change rate can be obtained by dividing an amount of change in a current value by time. The current change rate can be positive or negative. A maximum absolute value of the current change rate which the regulator 252 can cope with is set as a limit threshold value. The higher the target value, the larger the current change rate of the regulator 252. When the regulator 252 supplies the power supply current, if the current change exceeding the limit threshold value (the current change rate of the regulator 252 exceeding the limit threshold value) occurs, there is a concern that the regulator 252 may stop supplying the power supply current.

The regulator 252 is also set with the maximum value of current which the regulator 252 can cope with. For this reason, in the following embodiments, the current change rate may be read as the maximum current value.

The plurality of channel interfaces 251_1 to 251_N are located between the regulator 252, the control circuit 253, the transfer circuit 254, and the plurality of channels CH_1 to CH_N. The plurality of channel interfaces 251_1 to 251_N correspond to the plurality of channels CH_1 to CH_N. Each of the channel interfaces 251_1 to 251_N is connected to the corresponding channel CH. Each of the channel interfaces 251_1 to 251_N uses the power supplied from the regulator 252 under the control of the control circuit 253 to perform interface operations on the corresponding channel CH. For example, each of the channel interfaces 251_1 to 251_N can transfer the data from the transfer circuit 254 to the memory chip 31 via the channel CH, and receive the data from the memory chip 31 via the channel CH.

Each channel interface 251 may have a buffer memory 2513. The buffer memory 2513 can temporarily store data transmitted to the channel interface 251.

When the power supply current is supplied from the regulator 252 via the power supply line 255, the channel interface 251 can transfer the data to the nonvolatile memory 3 via the channel CH. The channel interface 251 can transfer data to the channel CH while temporarily storing at least a portion of the data in the buffer memory 2513.

The transfer circuit 254 is a circuit that receives write commands and write data from the host and transfers write commands and write data to each channel interface 251. The transfer circuit 254 may be a component such as a shift register in which a plurality of flip-flops are connected in series in a plurality of stages. The transfer circuit 254 may be supplied with a clock from a timing generator (not illustrated). When the data includes a plurality of bits and the plurality of bits are stored in a plurality of flip-flops, the transfer circuit 254 may sequentially shift the plurality of bits between the plurality of flip-flops in clock synchronization. The transfer circuit 254 may sequentially output the plurality of bits bit by bit from a final stage flip-flop in the shift register.

The control circuit 253 controls the channel interface 251. More specifically, the control circuit 253 is a circuit that controls the start timing of the data transfer when the data transmitted to the channel interface 251 is transferred to the nonvolatile memory 3. For example, when the access requests involving the data transfer to the two or more nonvolatile memories 3 via the two or more channels CH are generated in parallel, the control circuit 253 delays the timing at which the channel interface 251 starts the data transfer to the nonvolatile memory 3 via the channel CH by using the delay value according to the delay value parameter 41a.

The delay value parameter 41a is data in which the channel CH and the delay value are associated. The delay value parameter 41a includes the plurality of delay values. The delay value is a value for delaying the time from when the channel interface 251 receives the data from the transfer circuit 254 to when the channel interface 251 starts the data transfer via the channel CH. The delay value is associated with a combination of the channels CH on which the data transfer is performed in parallel. For example, when the data transfers to the channels CH_1 and CH_2 are started in parallel, a delay value D1 is set. When the data transfers to the channels CH_2 and CH_3 are started in parallel, a delay value D2 is set.

The delay value corresponding to the delay value parameter 41a is determined according to the speed of the control operation of the regulator 252. The delay value according to the delay value parameter 41a may be determined so that the current change rate from the regulator 252 is the limit threshold value or less. The limit threshold value is determined according to the speed of control operation that the regulator 252 can follow. Details will be described later.

The delay value parameter 41a is stored in the management information storage area of the nonvolatile memory 3. When the memory system 1 is powered on, the delay value parameter 41a may be read from the nonvolatile memory 3 by the controller and may be stored in the parameter buffer 41 of the buffer memory 4.

The control circuit 253 delays the start of the data transfer via a certain channel CH by a delay time converted from the delay value, and performs the data transfer via the channel CH. The conversion from the delay value to the delay time can be implemented, for example, by counting the number of clocks with a counter.

Whether the data transfer between the channels CH starts in parallel (that is, starts the data transfer simultaneously) may be determined by the difference in the start timing of the transfer of the control signal of the target channel CH, which is smaller than the response time of the regulator 252. When it is determined to be parallel (for example, simultaneously), the start timing of the transfer of the channel CH of which the transfer start is relatively slow or the designated channel CH may be delayed to the time longer than the response time of the regulator, or the time determined by setting.

Figure 2:
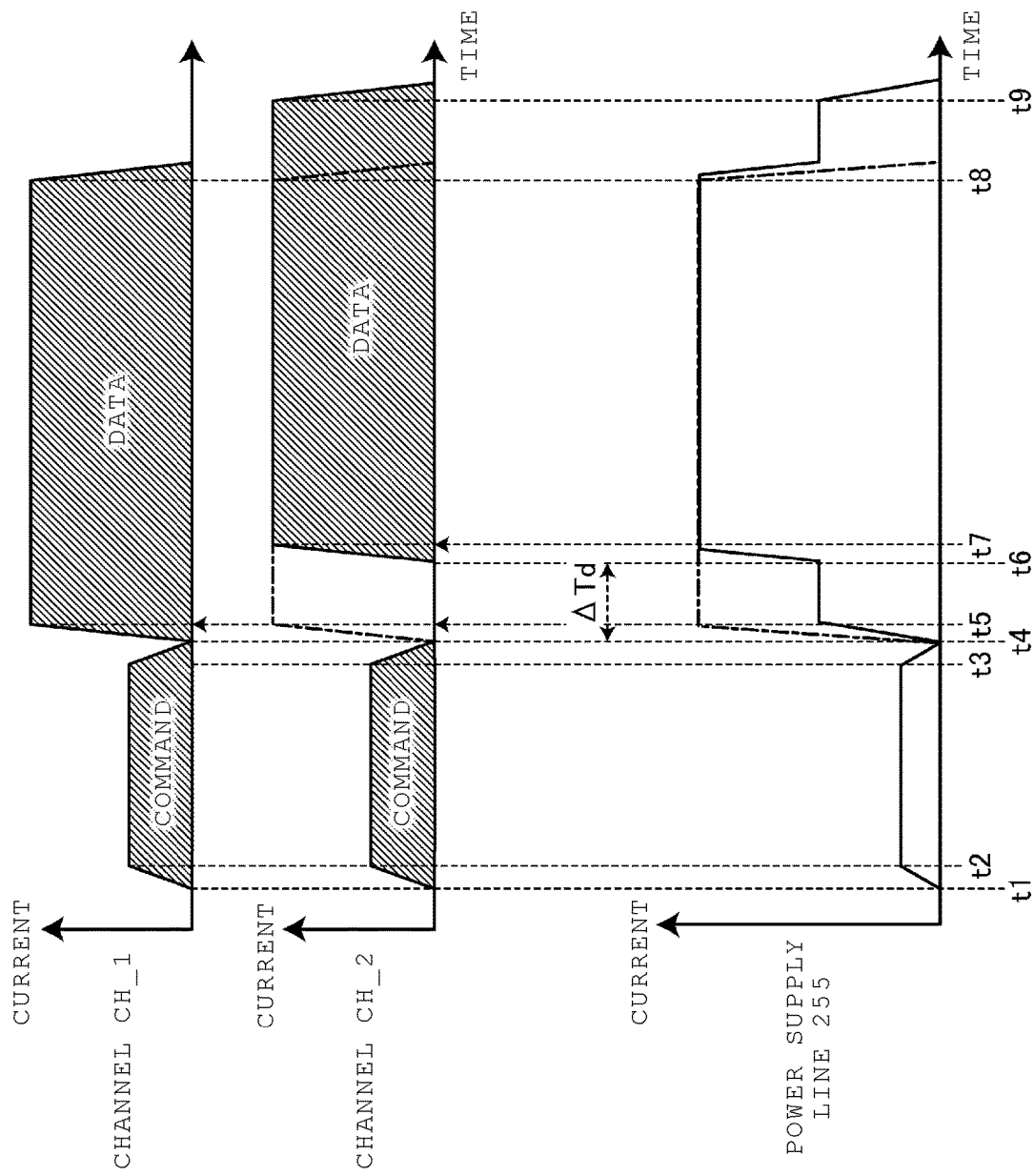
FIG. 2 is a waveform diagram illustrating operations of a memory interface in the first embodiment.

Next, operations of the memory interface 25 will be described with reference to FIG. 2. FIG. 2 is a waveform diagram illustrating current movement associated with the operation of the memory interface 25.

The graph in FIG. 2 represents changes in magnitude of current flowing through the channel CH_1, the channel CH_2, and the power supply line 255 in order from the top. The current change in the power supply line 255 is the same as a current change in an output current of the regulator 252 that supplies power to the power supply line 255. A case will be described where the memory interface 25 simultaneously receives a write command WC1 for the nonvolatile memory 3_1 and a write command WC2 for the nonvolatile memory 3_2.

At timing t1, the memory interface 25 almost simultaneously receives the write command WC1 for the nonvolatile memory 3_1 and the write command WC2 for the nonvolatile memory 3_2. At this time, the transfer circuit 254 almost simultaneously transfers the write commands WC1 and WC2 to the channel interfaces 251_1 and 251_2.

During the period from timing t1 to timing t2, the channel interfaces 251_1 and 251_2 operate by using the power supplied from the regulator 252 via the power supply line 255, and the write commands WC1 and WC2 are transmitted to the nonvolatile memories 3_1 and 3_2 via the channels CH_1 and CH_2, respectively. At this time, the frequencies of the signals of the write commands WC1 and WC2 are smaller than, for example, a frequency of a signal of a write data WD. Operating frequencies of the channel interfaces 251_1 and 251_2 are also smaller than an operating frequency of a write data WD signal. Accordingly, the current supplied from the regulator 252 to the power supply line 255 is relatively small as illustrated in FIG. 2.

Herein, since the current after timing t2 is relatively small, the current in the power supply line 255 is increased relatively gently between timings t1 and t2. In other words, the current change rate of the regulator 252 is relatively small and is to be the limit threshold value or less.

At timing t3, when the transfer of the write commands WC1 and WC2 is ended, the channel interfaces 251_1 and 251_2 stop operating, and the current flowing through the power supply line 255 is decreased relatively gently. Accordingly, the current change rate of the regulator 252 is allowed to be relatively small and to be the limit threshold value or less.

Next, at timing t4, the memory interface 25 almost simultaneously receives write data WD_1 for the nonvolatile memory 3_1 and the write data WD_2 for the nonvolatile memory 3_2. At this circuit time, the transfer 254 almost simultaneously transfers the write data WD_1 and WD_2 to the channel interfaces 251_1 and 251_2.

During the period from timing t4 to timing t5, the channel interfaces 251_1 and 251_2 operate by using the power supplied from the regulator 252 via the power supply line 255, and the write data WD_1 and WD_2 are transmitted to the nonvolatile memory 3_1 and 3_2 via the channels CH_1 and CH_2, respectively. At this time, the frequency of the signals of the write data WD_1 and WD_2 is higher than the frequency of the signal of the write command WC. The operating frequencies of the channel interfaces 251_1 and 251_2 are also higher than the operating frequency of the write command WC. Accordingly, as indicated by the one-dot dashed line in FIG. 2, the current supplied from the regulator 252 to the power supply line 255 becomes relatively large.

As indicated by the one-dot dashed line in FIG. 2, when the current supplied from the regulator 252 to the power supply line 255 is relatively large, since the current after the timing t5 is relatively large, the current of the power supply line 255 at timing t4 to timing t5 is increased relatively sharply. That is, the current change rate of the regulator 252 becomes relatively large and exceeds the limit threshold value. When the current change rate of the regulator 252 exceeds the limit threshold value, the regulator 252 has difficulty in following the control operation so that the power supply voltage is equal to the target value. Accordingly, the current supplied to the power supply line 255 is allowed to be unstable. Accordingly, the channel interface 251 is likely to malfunction.

Therefore, the control circuit 253 of this embodiment delays the start timing of the data transfer from the channel interfaces 251_1 and 251_2 to the nonvolatile memories 3_1 and 3_2 via the channels CH_1 and CH_2 by using the delay value parameter 41a. The control circuit 253 starts the data transfer via the channel CH_1 at timing t4, and the control circuit 253 starts the data transfer via the channel CH_2 at timing t6. The timing t6 is the timing delayed by the delay time ΔTd converted from the delay value corresponding to the delay value parameter 41a.

That is, during the period from timing t4 to timing t5, the channel interface 251_1 selectively operates by using the power supplied from the regulator 252 via the power supply line 255 to transfer the write data WD_1 to the nonvolatile memory 3_1 via the channel CH_1. At this time, since the operating channel interface is limited to the channel interface 251_1, as indicated by the solid line in FIG. 2, the current change rate supplied from the regulator 252 to the power supply line 255 can be reduced. In other words, the current change rate of the output current of the regulator 252 is allowed to be moderate.

During the period between timing t5 and timing t6, the current supplied from the regulator 252 to the power supply line 255 is maintained substantially constant and stable.

During the period from timing t6 to timing t7, the channel interface 251_2 additionally operates by using the power supplied from the regulator 252 via the power supply line 255, and the write data WD_2 is transferred to the nonvolatile memory 3_2 via the channel CH_2. At this time, the transfer of the write data WD_1 is continuously performed, and the channel interface 251_1 continuously performs the operations. By starting the operations of the channel interfaces 251 one by one, as indicated by the solid line in FIG. 2, the current change rate of the current supplied from the regulator 252 to the power supply line 255 can be reduced. In other words, the current change rate of the output current of the regulator 252 is allowed to be moderate.

As indicated by the solid line in FIG. 2, when delaying the start timing of the data transfer from the channel interface 251 to the nonvolatile memory 3, for the current in the power supply line 255, since the current rise is reduced between timing t5 and timing t6, the current from the regulator 252 is increased relatively gently between timings t4 and t5. The current change rate of the regulator 252 can be reduced and, thus, can be smaller than the limit threshold value.

Similarly, for the current in the power supply line 255, the difference between the current between timings t5 and t6 and the current after timing t7 becomes small compared to the case indicated by the one-dot dashed line. Along with this, the current from the regulator 252 at timings t6 to timing t7 is increased relatively gently. The current change rate in regulator 252 can be reduced and, thus, can be smaller than the limit threshold value. Accordingly, the regulator 252 can easily follow the control operation so that the power supply voltage becomes equal to the target value, and can allow the current in the power supply line 255 to be stabilized.

Next, at timing t8, when the transfer of the write data WD_1 is completed, the channel interface 251_1 stops operating. At this time, the transfer of the write data WD_2 is continuously performed, and the channel interface 251_2 continuously performs the operations. The current flowing through the power supply line 255 is decreased relatively gently and is maintained constant at the predetermined current. Accordingly, the current change rate of the regulator 252 is relatively small and becomes the limit threshold value or less.

At timing t9, when the transfer of the write data WD_2 is completed, the channel interface 251_2 stops operating, and the current flowing through the power supply line 255 is decreased relatively gently from the predetermined current. Accordingly, the current change rate of the regulator 252 is relatively small and becomes the limit threshold value or less.

By delaying the start timing of the data transfer from the channel interface 251 to the nonvolatile memory 3, the regulator 252 can easily follow the control operation so that the power supply voltage becomes equal to the target value. Accordingly, the current in the power supply line 255 during the write process of the memory system 1 can be stabilized.

Figure 3:
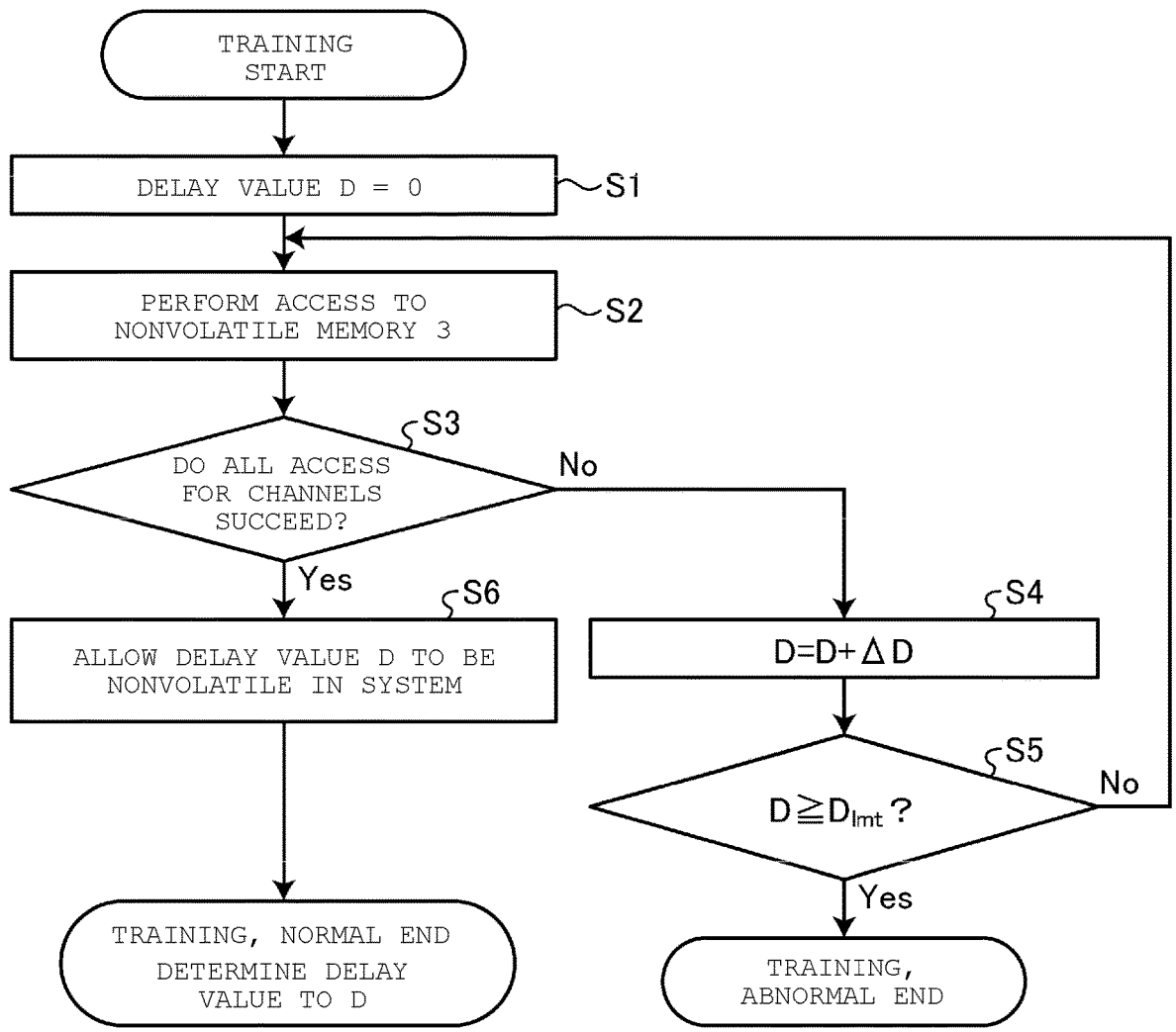
FIG. 3 is a flowchart illustrating training operations of a memory system in the first embodiment.

The controller 2 may determine the delay value to be converted into the delay time ΔTd by performing the training. FIG. 3 is a flowchart illustrating the training operations of the memory system 1. FIG. 3 illustrates the training of the operation when the memory interface 25 almost simultaneously receives the write data WD_1 to WD_N for the nonvolatile memories 3_1 to 3_N. The write data WD_1 to WD_N may be dummy data for the training.

It is noted that the training illustrated in FIG. 3 may be performed when the memory system 1 is started, may be performed when the memory system 1 is shipped, or may be performed at any timing when the memory system 1 is in operation.

In the memory system 1, the controller 2 searches for the delay value so that the current change rate of the regulator 252 is the limit threshold value or less.

For example, the controller 2 starts the training illustrated in FIG. 3 when the predetermined condition is satisfied. The predetermined condition may be that the training execution request is received from the host 100 and the delay value parameter 41a is not stored in the parameter buffer 41. In this case, when the delay value parameter 41a is already stored in the parameter buffer 41, the training illustrated in FIG. 3 may be skipped.

Alternatively, the predetermined condition may be receiving the training execution request from the host 100. In this case, when the delay value parameter 41a is already stored in the parameter buffer 41, the controller 2 may erase the delay value parameter 41a on the parameter buffer 41.

When starting the training, the controller 2 sets a delay value D to the initial value of "0" (S1).

The controller 2 accesses the nonvolatile memories 3_1 to 3_N by using the delay value D=0 (S2). For example, for the write data WD_1 to WD_N, the memory interface 25 delays the start timing of the data transfer from the channel interfaces 251_1 to 251_N to the nonvolatile memories 3_1 to 3_N via the channels CH_1 to CH_N by the delay value D=0. That is, the memory interface 25 almost simultaneously transfers the write data WD_1 to WD_N via the channels CH_1 to CH_N.

It is noted that the bit pattern of the data used for the training may be set to a toggle pattern in which 1 and 0 are repeated, for example, so that the current is increased.

The controller 2 determines whether the n accesses to the nonvolatile memory 3 succeed for all the channels CH_1 to CH_N that are training targets (S3). For example, for the write data WD_1 to WD_N, when the controller 2 receives the write failure notification from the nonvolatile memory 3 via at least one channel CH, the controller 2 determines that there is a channel CH for which the access fails (No in S3).

When there is a channel CH for which the access fails (No in S3), the controller 2 changes the delay value D. For example, the controller 2 sets the delay value D to D+ΔD obtained by increasing the delay value D by the predetermined value ΔD (for example, 1) (S4).

The controller 2 determines whether the delay value D is larger than or equal to the maximum allowable range value Dlmt (S5). The maximum allowable range value Dlmt is a value corresponding to the performance of the regulator 252. The maximum allowable range value Dlmt may correspond to the limit threshold value for the current change rate of the regulator 252. The maximum allowable range value Dlmt may correspond to the limit threshold value of the current change rate. The maximum allowable range value Dlmt may be a value which is the count value corresponding to the delay time during which the current change rate of the regulator 252 becomes smaller than the limit threshold value when the number of clocks is counted by the counter.

The controller 2 compares the delay value D with the maximum allowable range value Dlmt. When the delay value D is larger than or equal to the maximum allowable range value Dlmt (Yes in S5), the training is abnormally ended.

Herein, when the training is performed before the shipment of the memory system 1, the controller 2 determines that the regulator 252 is defective when the training ends abnormally. When the training is performed while the memory system 1 is in operation and the training is abnormally ended, the controller 2 determines deterioration of the regulator 252 and, after that, does not perform the operation of accessing the plurality of channels CH in parallel. Alternatively, the controller 2 notifies the host that the memory system 1 is in disorder.

The controller 2 compares the delay value D with the maximum allowable range value Dlmt. When the delay value D is smaller than the maximum allowable range value Dlmt (No in S5), the process returns to S2.

The loop of S2→S3→S4→S5→S2 is repeated until YES in S3 or YES in S5. For example, when the number of repetitions is n (n is an integer of 1 or more), the controller 2 sets the delay value D=n×ΔD in the n-th S4. After that, when the delay value D is smaller than the maximum allowable range value Dlmt (No in S5), the controller 2 accesses the nonvolatile memories 3_1 to 3_N by using the delay value D=n×ΔD (S2).

For example, for the write data WD_1 to WD_N, the memory interface 25 delays the start timing of the data transfer from the channel interfaces 251_1 to 251_N to the nonvolatile memories 3_1 to 3_N via the channels CH_1 to CH_N by the delay value D=n×ΔD. That is, after the transfer of the write data WD_1 via the channel CH_1 is started, the memory interface 25 delays the transfer of the write data WD_2 via the channel CH_2 by the delay time ΔTd converted from the delay value D=n×ΔD. After the transfer of the write data WD_2 via the channel CH_2 is started, the memory interface 25 delays the transfer of the write data WD_3 via the channel CH_3 by the delay time ΔTd converted from the delay value D=n×ΔD. After the transfer of the write data WD_(N-1) via the channel CH_(N-1) is started, the memory interface 25 delays the transfer of the write data WD_N via the channel CH_N by the delay time ΔTd converted from the delay value D=n×ΔD.

The controller 2 determines whether the access to the nonvolatile memory 3 succeeds for all the channels CH_1 to CH_N (S3). For example, for the write data WD_1 to WD_N, when the controller 2 receives the write completion notification from the nonvolatile memory 3 via all the channels CH_1 to CH_N, the controller 2 determines that the access to all the channels CH_1 to CH_N succeeds (Yes in S3).

When the access to all the channels CH_1 to CH_N succeeds (Yes in S3), the controller 2 determines the current delay value D as the delay value that allows the current change rate of the regulator 252 to be the limit threshold value or less. The controller 2 generates the delay value parameter 41a corresponding to the determined delay value D and writes the delay value parameter 41a in the parameter buffer 41 of the buffer memory 4. The controller 2 writes the delay value parameter 41a in the management information storage area of the nonvolatile memory 3 so as to be nonvolatile (S6).

Accordingly, when write access requests via the channels CH_1 and CH_2 are generated in parallel, the memory interface 25 reads and acquires the delay value parameter 41a from the management information storage area of the nonvolatile memory 3. The memory interface 25 can delay the start timing of the data transfer to the nonvolatile memories 3_1 and 3_2 via the channels CH_1 and CH_2 by the delay value corresponding to the delay value parameter 41a. That is, the memory interface 25 can convert the delay value corresponding to the delay value parameter 41a into the delay time and can delay the start timing of the data transfer to the nonvolatile memories 3_1 and 3_2 via the channels CH_1 and CH_2 by the converted delay time. Accordingly, the current change rate of the current supplied from the regulator 252 to the power supply line 255 can be reduced, and the current change rate can be allowed to be smaller than the limit threshold value.

As described above, in the embodiment, when the two or more access requests to the nonvolatile memory 3 are generated in parallel, the controller 2 delays the timing of starting the data transfer from the channel interface 251 to the nonvolatile memory 3 by the delay value corresponding to the delay value parameter 41a. Accordingly, the control operation of the power supply current by the regulator 252 can be stabilized, and malfunction of the channel interface 251 receiving the power supply current can be prevented.

It is noted that the delay value parameter 41a may be stored in the eFUSE (not illustrated) instead of the nonvolatile memory 3. The eFUSE is a memory that unrewritably stores initial parameters in the memory system 1. When there is an unused area in the eFUSE, the delay value parameter 41a can be allowed to be nonvolatile in the memory system 1 by storing the delay value parameter 41a in the unused area. In this case, when two or more access requests to the nonvolatile memory 3 are generated in parallel, the controller 2 acquires the delay value parameter 41a from the eFUSE.

In addition, when the data transfer from the nonvolatile memory 3 to the memory interface 25 is performed, the read enable signal REZ may be used as the control signal for the channel CH for delaying the start timing. The read enable signal REZ is a clock used when processing the read request from the host. When the data is transferred from the memory interface 25 to the nonvolatile memory 3, a data strobe signal DQS may be used as the control signal for the channel CH for delaying the start timing. The data strobe signal DQS is a clock used when processing the write request from the host. In the following embodiments and modified examples, steps including substantially the same processing as in FIG. 3 are denoted by the same step numbers. Different characters or numbers may be added to the end of the same step number when specifically distinguishing between steps including similar processing.

Modified Example 1 of First Embodiment

Figure 4:
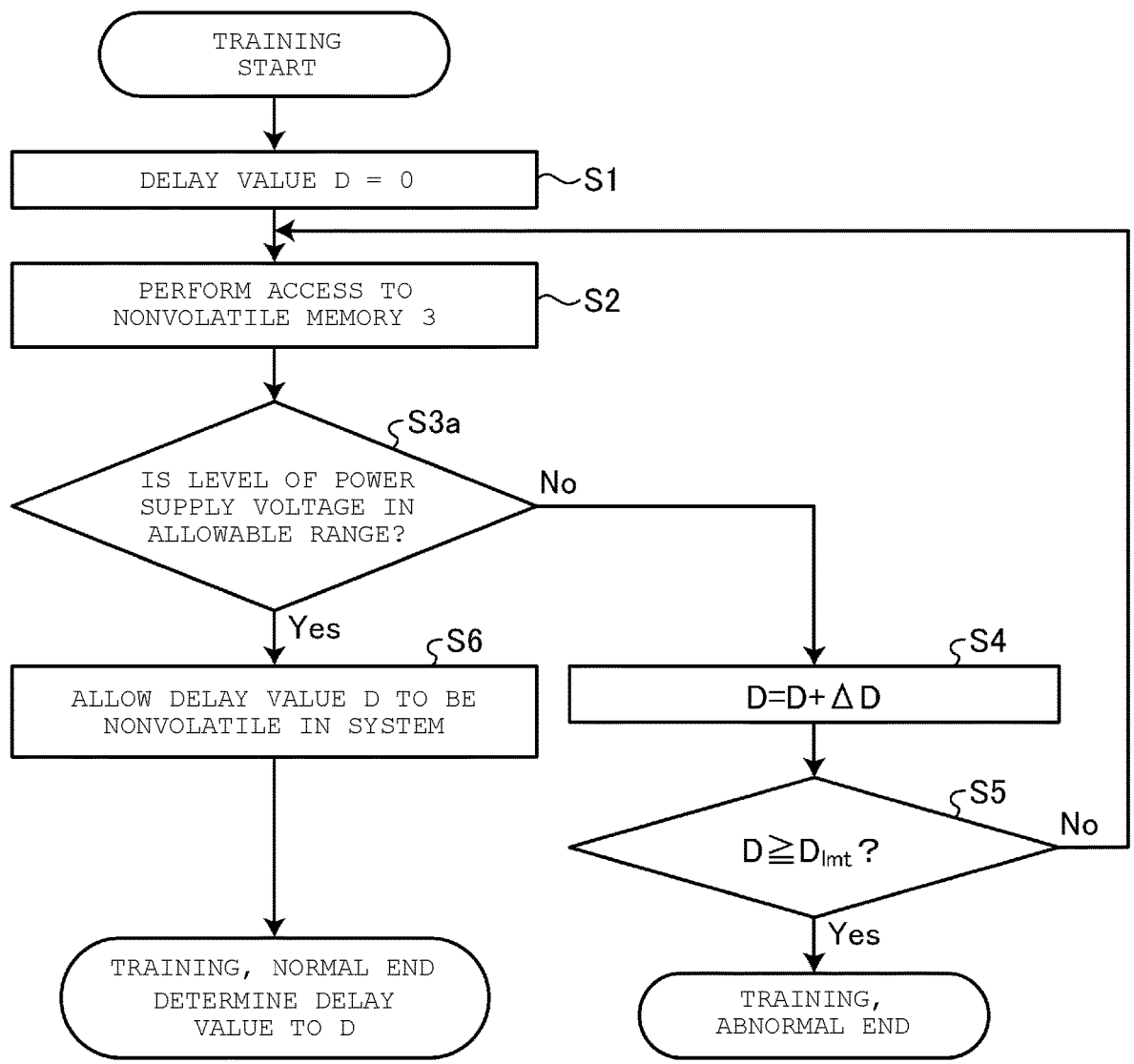
FIG. 4 is a flowchart illustrating training operations of a memory system in Modified Example 1 of the first embodiment.

In the first embodiment, the memory system 1 determines the delay value according to whether the access of the channel succeeds or fails. In Modified Example 1 of the embodiment, as illustrated in FIG. 4, the memory system 1 may determine the delay value according to whether the level of the power supply voltage of the power supply line 255 is in an allowable range (whether the regulator 252 normally operates) instead of whether the access of the channel succeeds or fails. FIG. 4 is a flowchart illustrating training operations of the memory system 1 in Modified Example 1 of the first embodiment.

It is noted that the training illustrated in FIG. 4 may be performed when the memory system 1 is started, may be performed when the memory system 1 is shipped, or may be performed at any timing when the memory system 1 is in operation.

For example, the controller 2 starts training illustrated in FIG. 4 according to the fact that a predetermined condition is satisfied. The predetermined condition may be that the training execution request is received from the host 100 and the delay value parameter 41a is not stored in the parameter buffer 41. In this case, when the delay value parameter 41a is already stored in the parameter buffer 41, the training illustrated in FIG. 4 may be skipped.

Alternatively, the predetermined condition may be receiving the training execution request from the host 100. In this case, when the delay value parameter 41a is already stored in the parameter buffer 41, the controller 2 may erase the delay value parameter 41a on the parameter buffer 41.

In the memory system 1, the controller 2 performs operations differently from those of FIG. 3 in the following points. After performing the processes of S1 and S2, the controller 2 detects the level of the power supply line 255 and determines whether the level of the power supply voltage is in an allowable range (S3a). For example, when the allowable range is 2.7 V to 3.456 V, the controller 2 performs the process of S4 when the level of the power supply line 255 is attenuated outside the allowable range (2.7 V to 3.456 V) (No in S3a). When the level of the power supply line 255 falls in the allowable range (2.7 V to 3.456 V) (Yes in S3a), the controller 2 writes the delay value parameter 41a to the management information storage area of the nonvolatile memory 3 so as to be nonvolatile (S6).

Accordingly, when the write access requests via the channels CH_1 and CH_2 are generated in parallel, the memory interface 25 reads and acquires the delay value parameter 41a from the management information storage area of the nonvolatile memory 3.

With such an operation, the delay value that allows the current change rate of the regulator 252 to be the limit threshold value or less can be determined. Accordingly, the control operation of the power supply current by the regulator 252 can be stabilized, and malfunction of the channel interface 251 receiving the power supply current can be prevented.

Modified Example 2 of First Embodiment

Alternatively, although not illustrated, the controller 2 may be provided with a function (current measurement function) of measuring an operating current of the regulator 252. The memory interface 25 may incorporate the current measurement function.

Figure 5:
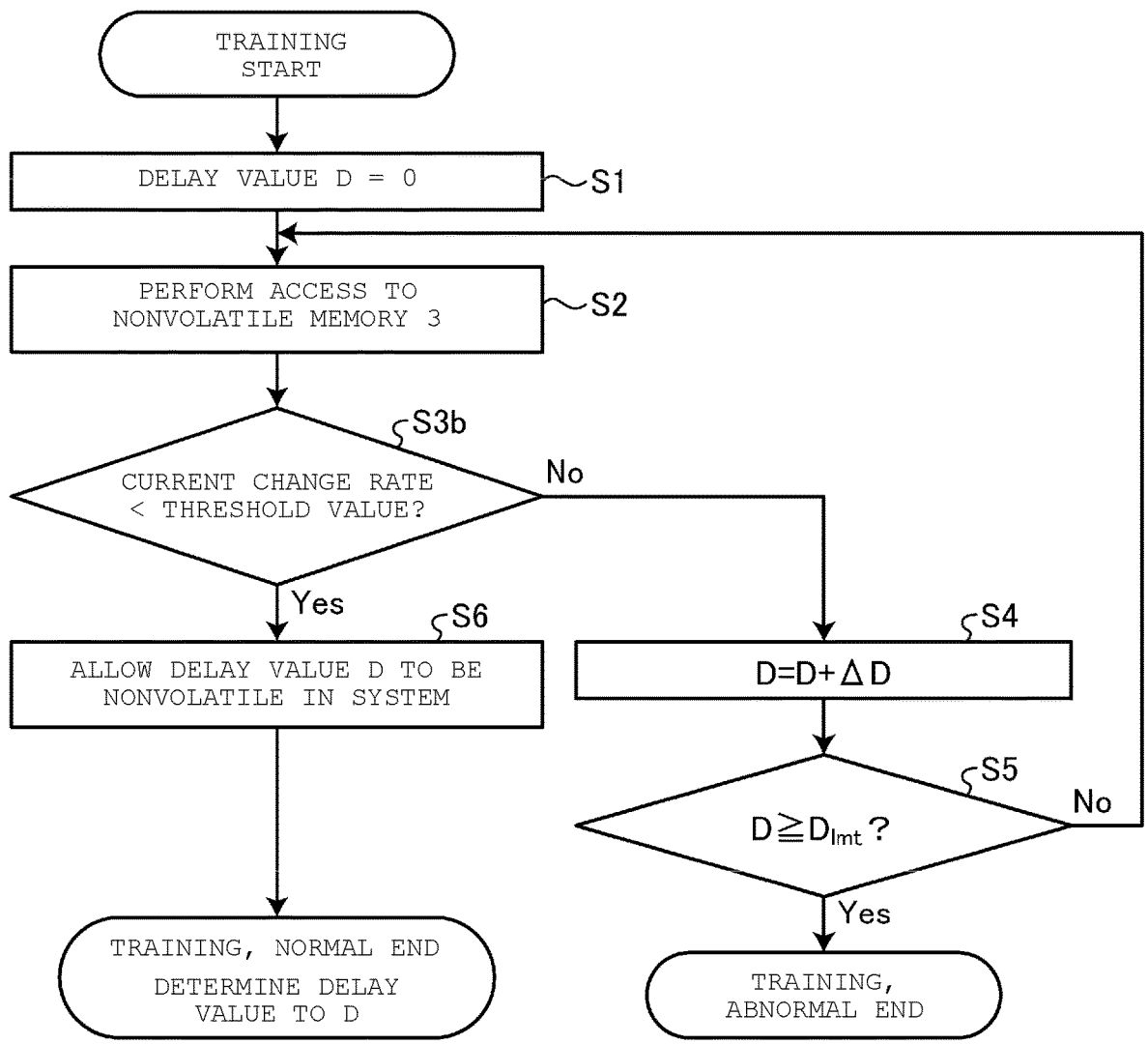
FIG. 5 is a flowchart illustrating training operations of a memory system in Modified Example 2 of the first embodiment.

As Modified Example 2 of the first embodiment, as illustrated in FIG. 5, the memory system 1 may determine the delay value according to the current change rate instead of whether the access of the channel succeeds or fails. FIG. 5 is a flowchart illustrating training operations of the memory system 1 in Modified Example 2 of the first embodiment.

It is noted that the training illustrated in FIG. 5 may be performed when the memory system 1 is started, may be performed when the memory system 1 is shipped, or may be performed at any timing when the memory system 1 is in operation.

For example, the controller 2 starts training illustrated in FIG. 5 according to the fact that a predetermined condition is satisfied. The predetermined condition may be that the training execution request is received from the host 100 and the delay value parameter 41a is not stored in the parameter buffer 41. In this case, when the delay value parameter 41a is already stored in the parameter buffer 41, the training illustrated in FIG. 5 may be skipped.

Alternatively, the predetermined condition may be receiving the training execution request from the host 100. In this case, when the delay value parameter 41a is already stored in the parameter buffer 41, the controller 2 may erase the delay value parameter 41a on the parameter buffer 41.

In the memory system 1, the controller 2 performs operations differently from those of FIG. 3 in the following points. After performing the process of S2, the controller 2 detects the current flowing through the power supply line 255 and determines whether the current change rate is smaller than the limit threshold value (S3b). When the current change rate of the power supply line 255 is equal to or higher than the limit threshold value (No in S3b), the controller 2 performs the process of S4. When the current change rate of the power supply line 255 is smaller than the limit threshold value (Yes in S3b), the controller 2 writes the delay value parameter 41a in the management information storage area of the nonvolatile memory 3 so as to be nonvolatile (S6).

Accordingly, when the write access requests via the channels CH_1 and CH_2 are generated in parallel, the memory interface 25 reads and acquires the delay value parameter 41a from the management information storage area of the nonvolatile memory 3.

With such an operation, the delay value that allows the current change rate of the regulator 252 to be the limit threshold value or less can be determined. Accordingly, the control operation of the power supply current by the regulator 252 can be stabilized, and malfunction of the channel interface 251 receiving the power supply current can be prevented.

Modified Example 3 of First Embodiment

Figure 6:
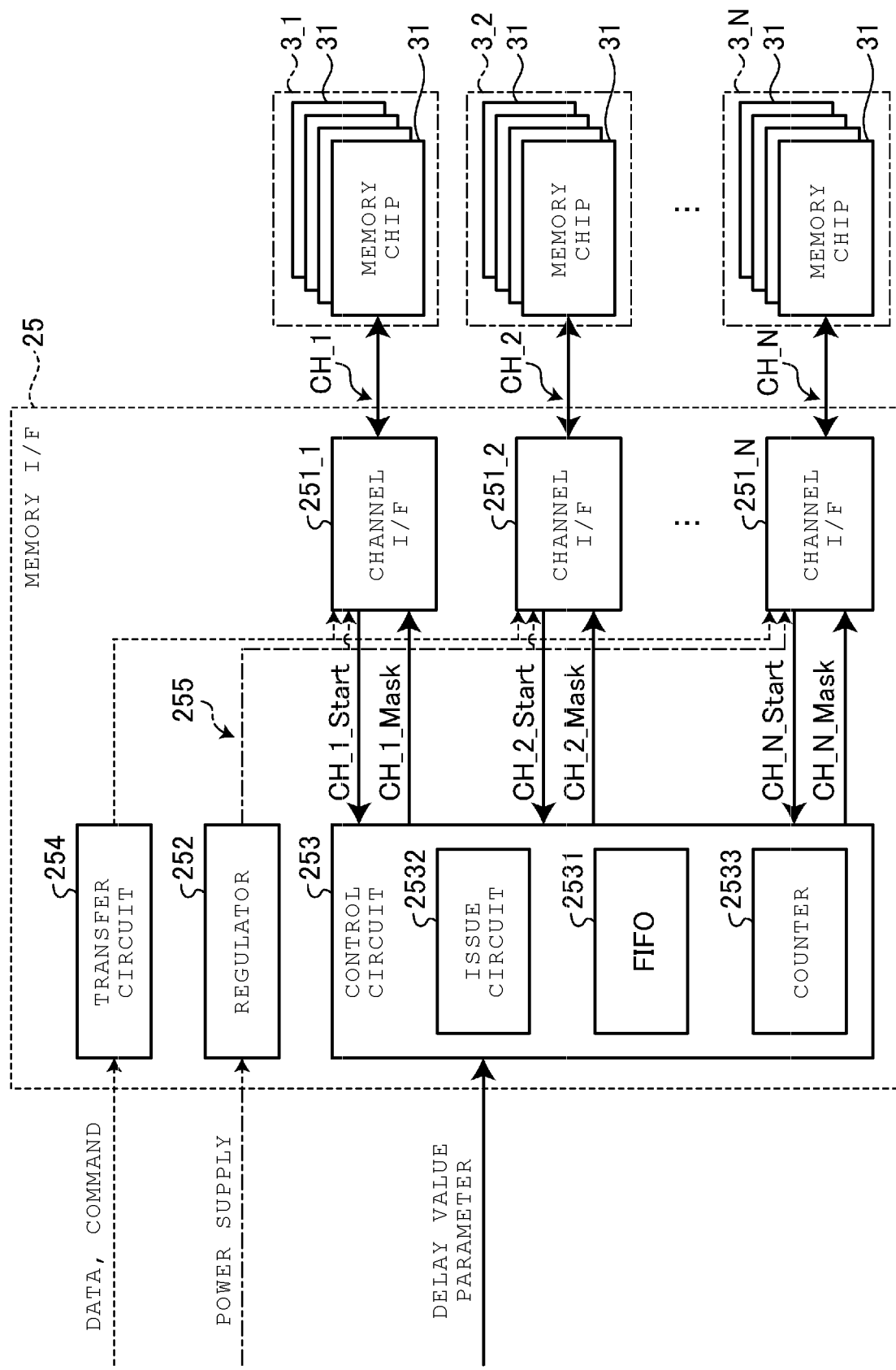
FIG. 6 is a circuit diagram illustrating a configuration and operations of a memory interface in Modified Example 3 of the first embodiment.

In addition, as Modified Example 3 of the first embodiment, the operation of delaying the start timing of the data transfer by the delay value D may be implemented by the configuration and operations of the memory interface as illustrated in FIG. 6. FIG. 6 is a circuit diagram illustrating the configuration and operations of the memory interface 25 in Modified Example 3 of the first embodiment.

As illustrated in FIG. 6, the memory interface 25 exchanges signals between the channel interfaces 251_1 to 251_N and the control circuit 253 when access requests via the plurality of channels CH_1 to CH_N are generated in parallel, and thus, the start timing of the data transfer between the plurality of channels CH_1 to CH_N is adjusted.

In Modified Example 3 of the first embodiment, the channel interface 251 transmits a start request SR requesting an instruction to start transferring the data to the nonvolatile memory 3 to the control circuit 253. When receiving the start request SR from the channel interface 251, the control circuit 253 acquires the delay value parameter 41a from the nonvolatile memory 3. At the predetermined timing, the control circuit 253 issues a start instruction SI corresponding to the start request SR to the channel interface 251. The start instruction SI is a signal that instructs the start of the data transfer.

Specifically, the control circuit 253 includes a first-in-first-out (FIFO) circuit 2531, an issue circuit 2532, and a counter 2533.

The issue circuit 2532 stores the start request SR transmitted by the channel interface 251 in the FIFO circuit 2531. The FIFO circuit 2531 has a plurality of stages of queues. When receiving the start request SR, the issue circuit 2532 sequentially stores the start request SR from the head queue of the FIFO circuit 2531.

The issue circuit 2532 adjusts the start timing of the data transfer between the plurality of channel interfaces 251_1 to 251_N according to one or more start requests SR stored in the FIFO circuit 2531. The issue circuit 2532 fetches the start request SR from the head queue of the FIFO circuit 2531. The FIFO circuit 2531 shifts the stored start request SR to the head side queue every time the start request SR is fetched from the head queue. The issue circuit 2532 issues the start instruction SI according to the fetched start request SR.

The counter 2533 receives a predetermined reference clock CLK and counts the number of clocks. When the issue circuit 2532 issues the start instruction SI, the counter 2533 starts counting operation. When the count value reaches the delay value D, the counter 2533 notifies the issue circuit 2532 of the fact that the count value reaches the delay value D (count completion notification).

When the issue circuit 2532 receives the count completion notification, the issue circuit 2532 fetches the start request SR from the head queue of the FIFO circuit 2531 again. The issue circuit 2532 issues the start instruction SI according to the fetched start request SR.

For example, the write command and the write data are transferred from the transfer circuit 254 to the channel interfaces 251_1 and 251_2. The channel interface 251_1 transmits a start request SR1 to the control circuit 253. The channel interface 251_2 transmits a start request SR2 to the control circuit 253. When receiving the start requests SR1 and SR2, the control circuit 253 acquires the delay value parameter 41a from the nonvolatile memory 3 and stores the delay value parameter 41a in the parameter buffer 41. At first timing, the control circuit 253 issues a start instruction SI1 to the channel interface 251_1 according to the start request SR1. At second timing delayed by the delay value D from the first timing, the control circuit 253 issues a start instruction SI2 according to the start request SR2 to the channel interface 251_2.

Specifically, the channel interfaces 251_1 and 252_2 almost simultaneously receive write data WD1 and WD2 from transfer circuit 254. That is, the write access requests via the channels CH_1 and CH_2 are generated in parallel. When receiving the write data WD1, the channel interface 251_1 transmits a start signal CH_1_Start to the control circuit 253 as the start request SR. In parallel, according to receiving the write data WD2, the channel interface 251_2 transmits a start signal CH_2_Start to the control circuit 253 as the start request SR.

The control circuit 253 determines that the start signal CH_1_Start is to be first processed among the start signal CH_1_Start and the start signal CH_2_Start based on the predetermined specification. The predetermined specification may be to process the start signals on a first-come-first-served basis.

The control circuit 253 transmits a non-active level mask signal CH_1_Mask to the channel interface 251_1. At the same time, the control circuit 253 transmits the active level mask signal CH_1_Mask to the channel interface 251_2. The channel interface 251 waits for the data transfer when the mask signal is at the active level. The channel interface 251 starts the data transfer when the mask signal transitions from the active level to the non-active level.

At timing t4, the channel interface 251_1 starts transferring the write data WD_1 to the nonvolatile memory 3_1 via the channel CH_1 according to the non-active level mask signal CH_1_Mask.

On the other hand, the channel interface 251_2 waits without transferring the write data WD_2 according to an active level mask signal CH_2_Mask.

Next, the control circuit 253 measures the delay time ΔTd converted from the delay value D. At timing t6 after the delay time ΔTd has elapsed from timing t4, the control circuit 253 allows the mask signal CH_2_Mask to transition from the active level to the non-active level. That is, the control circuit 253 issues the non-active level mask signal CH_2_Mask to the channel interface 251_2 as the start instruction for instructing the start of the data transfer. According to the non-active level mask signal CH_2_Mask, the channel interface 251_2 starts transferring the write data WD_2 to the nonvolatile memory 3_2 via the channel CH_2.

That is, during the period from timing t4 to timing t5, the channel interface 251_1 selectively operates by using the power supplied from the regulator 252 via the power supply line 255 to transfer the write data WD_1 to the nonvolatile memory 3_1 via the channel CH_1. At this time, since the operating channel interface is limited to the channel interface 251_1, as indicated by a solid line in FIG. 2, the change rate of the current supplied from the regulator 252 to the power supply line 255 can be reduced.

During the period from timing t6 to timing t7, the channel interface 251_2 additionally operates by using the power supplied from the regulator 252 via the power supply line 255 and transfers the write data WD_2 to the nonvolatile memory 3_2 via the channel CH_2. At this time, since the channel interface that additionally operates is limited to the channel interface 251_2, as indicated by a solid line in FIG. 2, the change rate of the current supplied from the regulator 252 to the power supply line 255 can be reduced.

Figure 7:
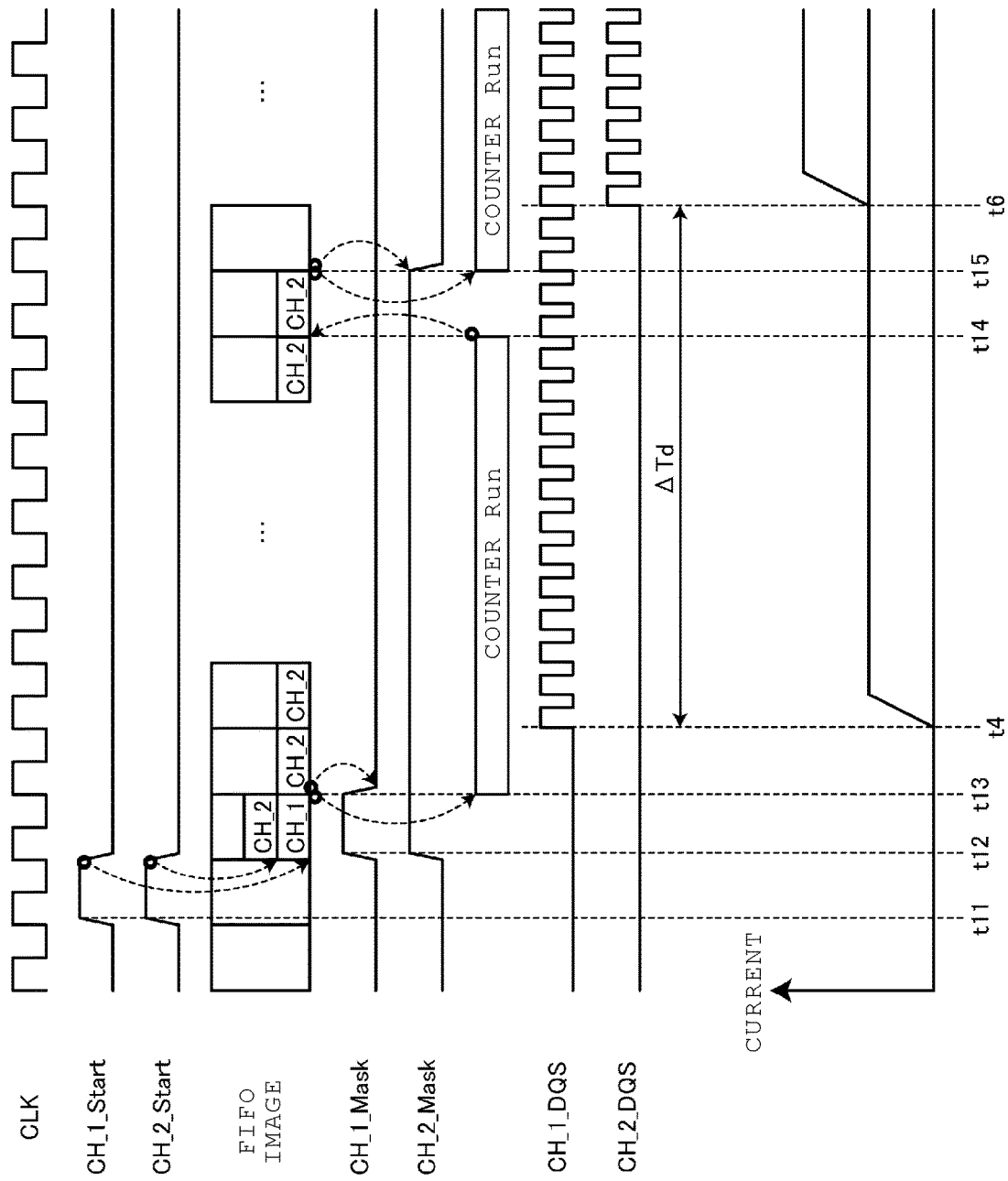
FIG. 7 is a waveform diagram illustrating an example of the operations of the memory interface in Modified Example 3 of the first embodiment.

FIG. 7 is a waveform diagram illustrating an example of the operations of the memory interface 25 in Modified Example 3 of the first embodiment. For example, at timing t11, the control circuit 253 receives the start signals CH_1_Start and CH_2_Start in order from the channel interfaces 251_1 and 251_2. The control circuit 253 reads the delay value parameter 41a from the nonvolatile memory 3.

At timing t12, the FIFO circuit 2531 puts the start signal CH_1_Start received first among the start signals CH_1_Start and CH_2_Start into the head queue of the FIFO circuit 2531. The FIFO circuit 2531 puts the next received start signal CH_1_Start into the queue of the next stage. The issue circuit 2532 collectively transitions the mask signals CH_1_Mask to CH_N_Mask of each channel to the active level. The issue circuit 2532 sets the delay value D (for example, D=8) according to the delay value parameter 41a in the counter 2533 as the count value for ending counting.

At timing t13, the issue circuit 2532 fetches the start signal CH_1_Start from the head queue of the FIFO circuit 2531. The FIFO circuit 2531 shifts the start signal CH_2_Start from the next-stage queue to the head queue. The issue circuit 2532 allows the mask signal CH_1_Mask to transition from the active level to the non-active level according to the extracted start signal CH_1_Start. The counter 2533 starts counting the number of clocks of the reference clock CLK.

At timing t4, the channel interface 251_1 starts toggling the data strobe signal CH_1 DQS according to the non-active level of the mask signal CH_1_Mask, and starts the transfer of the write data WD_1 to the nonvolatile memory 3_1 via the channel CH_1.

At timing t14, when the count value reaches the delay value D, the counter 2533 transmits the count completion notification to the FIFO circuit 2531. After that, the counter 2533 resets the count value.

At timing t15, the issue circuit 2532 fetches the start signal CH_2_Start from the head queue of the FIFO circuit 2531. The issue circuit 2532 allows the mask signal CH_2_Mask to transition from the active level to the non-active level according to the extracted start signal CH_2_Start. The counter 2533 restarts counting the number of clocks of the reference clock CLK.

At timing t6, the channel interface 251_2 starts toggling the data strobe signal CH_2_DQS according to the non-active level of the mask signal CH_2_Mask, and starts the transfer of the write data WD_2 to the nonvolatile memory 3_2 via the channel CH_2.

With such the configuration and operations, when the access requests via the plurality of channels CH_1 to CH_N are generated in parallel, the memory interface 25 can delay the start timing of the data transfer between the plurality of channels CH_1 to CH_N by the delay value D.

Accordingly, the current change rate of the current supplied from the regulator 252 to the power supply line 255 can be reduced, and the current change rate can be allowed to be smaller than the limit threshold value. Accordingly, the control operation of the power supply current by the regulator 252 can be stabilized, and malfunction of the channel interface 251 receiving the power supply current can be reduced.

Second Embodiment

In the first embodiment, when the plurality of channels are accessed in parallel, the delay value is determined so that the current change rate of the regulator 252 becomes the limit threshold value or less. Compared to the first embodiment, the second embodiment determines the number of channels to which the access can be performed in parallel instead of determining the delay time.

Since the configuration of the memory system of the second embodiment is the same as that of the memory system of the first embodiment, the same configurations of the memory system of the second embodiment as those of the memory system of the first embodiment are denoted by the same reference numerals, and the description thereof is omitted.

When the controller 2 accesses the plurality of channels in parallel, the training is performed to find the number of channels for which the current change rate of the regulator 252 is smaller than the limit threshold value.

Figure 8:
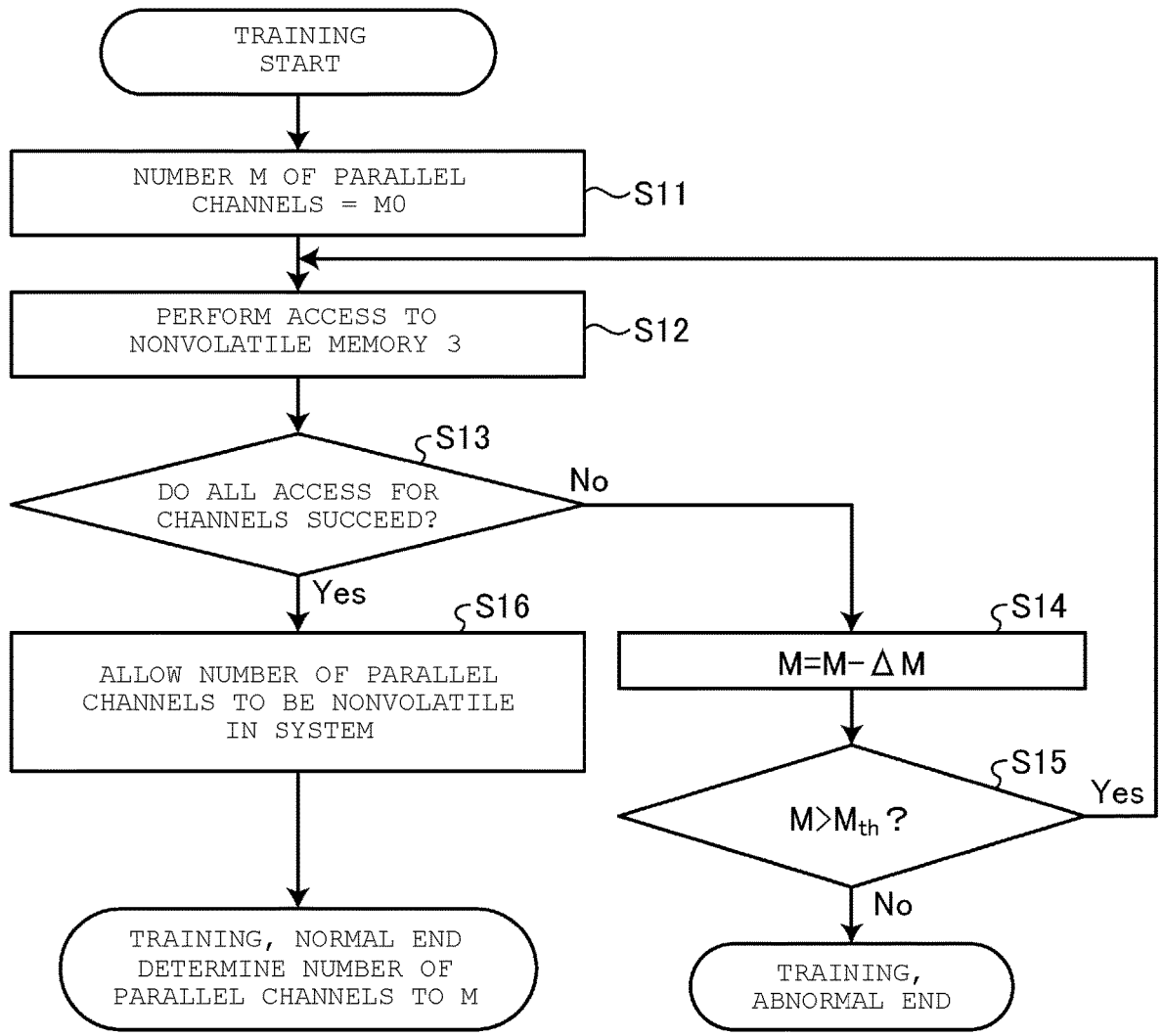
FIG. 8 is a flowchart illustrating training operations of a memory system in a second embodiment.

FIG. 8 is a flowchart illustrating the training operation of the memory system 1 according to the second embodiment. FIG. 8 illustrates operation training when the memory interface 25 almost simultaneously receives the write data WD_1 to WD_N for the nonvolatile memories 3_1 to 3_N.

It is noted that the training illustrated in FIG. 8 may be performed when the memory system 1 is started, may be performed when the memory system 1 is shipped, or may be performed at any timing when the memory system 1 is in operation.

For example, the controller 2 starts the training illustrated in FIG. 8 when the predetermined condition is satisfied. The predetermined condition may be that the training execution request is received from the host 100 and the parallel channel number parameter 41b is not stored in the parameter buffer 41. In this case, when the parallel channel number parameter 41b is already stored in the parameter buffer 41, the training illustrated in FIG. 8 may be skipped.

Alternatively, the predetermined condition may be receiving the training execution request from the host 100. In this case, when the parallel channel number parameter 41b is already stored in the parameter buffer 41, the controller 2 may erase the parallel channel number parameter 41b on the parameter buffer 41.

When the controller 2 starts training for the number of parallel channels, the controller 2 sets the initial value M0 to the number M of parallel channels (S11). M0=8 may be used.

The controller 2 uses the number M of parallel channels as M=M0 to access M nonvolatile memories 3 among the N nonvolatile memories 3_1 to 3_N in parallel (S12). For example, for the write data WD_1 to WD_M, the memory interface 25 starts the data transfer from the channel interfaces 251_1 to 251_M to the nonvolatile memories 3_1 to 3_M via the channels CH_1 to CH_M at the same timing. Accordingly, the memory interface 25 performs the transfer of the write data WD_1 to WD_M via the channels CH_1 to CH_M in parallel.

The controller 2 determines whether the access to the nonvolatile memory 3 succeeds for all the channels CH_1 to CH_M that are a training target (S13). For example, for the write data WD_1 to WD_M, when the controller 2 receives the write failure notification from the nonvolatile memory 3 via at least one channel CH, the controller 2 determines that there is a channel CH for which the access fails (No in S13).

When there is a channel CH for which the access fails (No in S13), the controller 2 changes the number M of parallel channels. For example, the controller 2 sets M−ΔM obtained by subtracting the predetermined number ΔM (for example, 1) from the number M of parallel channels to the number M of parallel channels (S14).

The controller 2 determines whether the number M of parallel channels is larger than a minimum allowable channel number Mth (S15). The minimum allowable channel number Mth=1 may be used.

The controller 2 compares the number M of parallel channels with the minimum allowable channel number Mth. When the number M of parallel channels is the minimum allowable channel number Mth or less (No in S15), the controller 2 abnormally ends the training.

The controller 2 compares the number M of parallel channels with the minimum allowable channel number Mth. When the number M of parallel channels is larger than the minimum allowable channel number Mth (Yes in S15), the controller 2 returns the process to S12.

The controller 2 determines whether the access to the nonvolatile memory 3 succeeds for all the channels CH_1 to CH_M that are training targets (S13). For example, for the write data WD_1 to WD_M, when the controller 2 receives the write completion notification from the nonvolatile memory 3 via all the channels CH_1 to CH_M, the controller 2 determines that the access to all the channels CH_1 to CH_M succeeds (Yes in S13).

When the access to all the channels CH_1 to CH_M succeeds (Yes in S13), the controller 2 determines the current number M of parallel channels as the parallel channel number that allows the current change rate of the regulator 252 to be the limit threshold value or less. The controller 2 generates the parallel channel number parameter 41b corresponding to the determined number M of parallel channels on the buffer memory 4 and stores the parallel channel number parameter 41b in the parameter buffer 41. The controller 2 writes the parallel channel number parameter 41b in the management information storage area of the nonvolatile memory 3 so as to be nonvolatile (S16).

Accordingly, when the write access requests via the channels CH_1 to CH_N are generated in parallel, the memory interface 25 reads and acquires the parallel channel number parameter 41b from the management information storage area of the nonvolatile memory 3. The memory interface 25 can limit the number of channels for performing the data transfer in parallel to the number M of channels according to the parallel channel number parameter 41b. Accordingly, the current change rate of the current supplied from the regulator 252 to the power supply line 255 can be reduced to be the limit threshold value or less, and deterioration of the regulator 252 can be prevented. In addition, the embodiment can cope with aging degradation of the regulator 252 due to long-term operation of the system, individual differences in chip characteristics, and the like. In addition, the embodiment can flexibly cope with the change in the number of channels mounted on the memory interface 25.

Modified Example 1 of Second Embodiment

Figure 9:
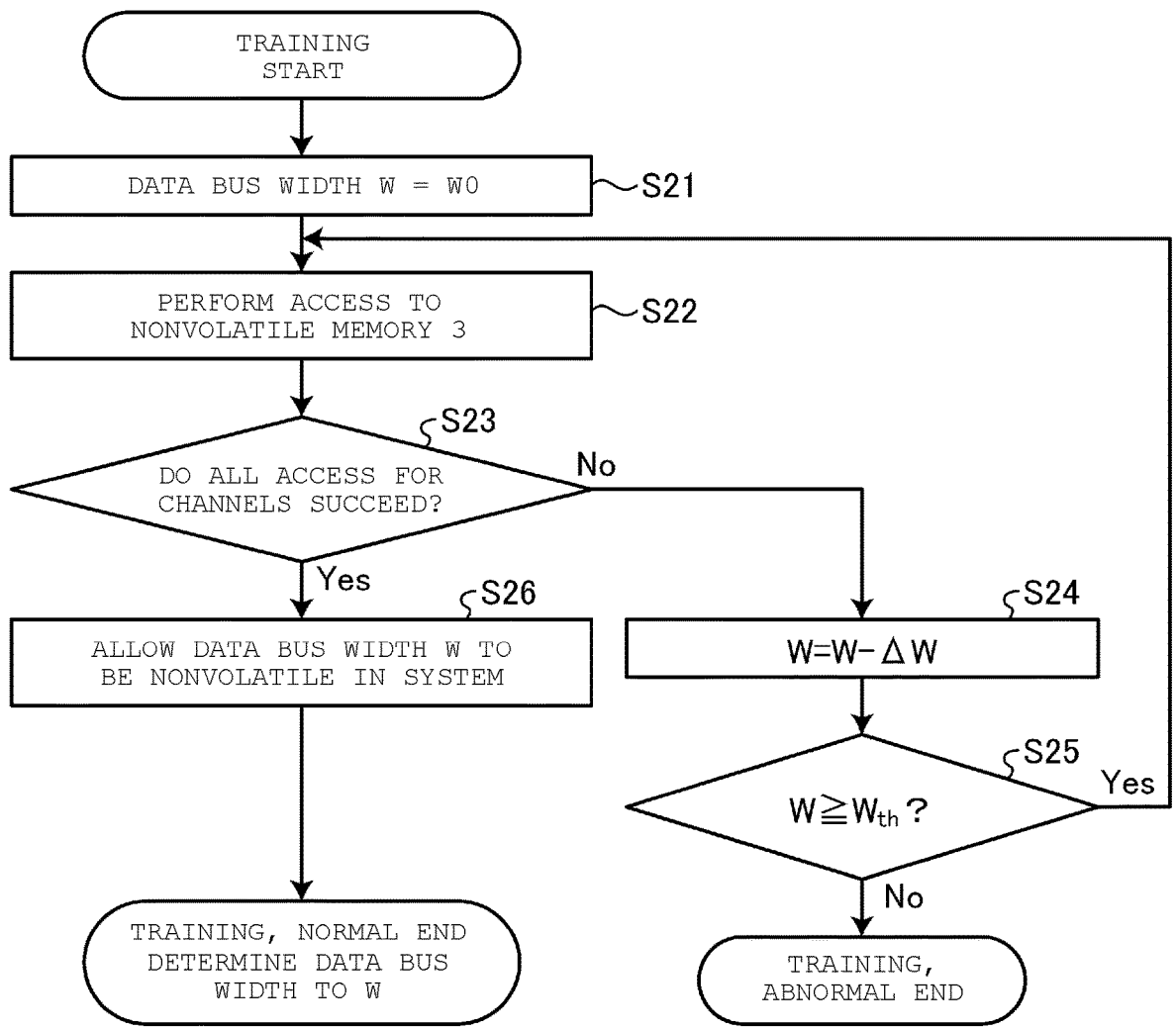
FIG. 9 is a flowchart illustrating training operations of the memory system in Modified Example 1 of the second embodiment.

As Modified Example 1 of the second embodiment, as illustrated in FIG. 9, the memory system 1 may perform training on a data bus width of each number of channels.

FIG. 9 is a flowchart illustrating training operations of the memory system 1 according to Modified Example 1 of the second embodiment. FIG. 9 illustrates an example of the training of the operation when the memory interface 25 almost simultaneously receives the write data WD_1 to WD_N for the nonvolatile memories 3_1 to 3_N.

It is noted that the training illustrated in FIG. 9 may be performed when the memory system 1 is started, may be performed when the memory system 1 is shipped, or may be performed at any timing when the memory system 1 is in operation.

For example, the controller 2 starts the training illustrated in FIG. 9 when the predetermined condition is satisfied. The predetermined condition may be that the training execution request is received from the host 100 and the data bus width parameter 41c is not stored in the parameter buffer 41. In this case, when the data bus width parameter 41c is already stored in the parameter buffer 41, the training illustrated in FIG. 9 may be skipped.

Alternatively, the predetermined condition may be receiving the training execution request from the host 100. In this case, when the data bus width parameter 41c is already stored in the parameter buffer 41, the controller 2 may erase the data bus width parameter 41c on the parameter buffer 41.

In the memory system 1, the controller 2 swings the data bus width for each number of channels and searches for the data bus width that allows the current change rate of the regulator 252 to be the limit threshold value or less.

When starting the training of the data bus width, the controller 2 sets the data bus width W to the initial value W0 (S21). W0 may be 16 (bits).

The controller 2 accesses the N nonvolatile memories 3_1 to 3_N by using the data bus width W=W0 (S22). For example, for the write data WD_1 to WD_N, the memory interface 25 delays, by the delay value D, the timing at which the data transfer from the channel interfaces 251_1 to 251_N to the nonvolatile memories 3_1 to 3_N via the channels CH_1 to CH_N is started. Accordingly, the memory interface 25 transfers the write data WD_1 to WD_N via the channels CH_1 to CH_N in parallel while changing the timing of starting the transfer of the write data to each channel.

The controller 2 determines whether the access to the nonvolatile memory 3 succeeds for all the channels CH_1 to CH_N that are training targets (S23). For example, for the write data WD_1 to WD_N, when the controller 2 receives the write failure notification from the nonvolatile memory 3 via at least one channel CH, the controller 2 determines that there is a channel CH for which the access fails (No in S23).

When there is a channel CH for which the access fails (No in S23), the controller 2 changes the data bus width W. For example, the controller 2 sets to the data bus width W W−ΔW obtained by subtracting the predetermined number ΔW (for example, 4 (bits)) from the data bus width W (S24).

The controller 2 determines whether the data bus width W is larger than the minimum allowable width Wth (S25). The minimum allowable width Wth may be 4 (bits).

The controller 2 compares the data bus width W with the minimum allowable width Wth. When the data bus width W is smaller than the minimum allowable width Wth (No in S25), the controller 2 abnormally ends the training.

The controller 2 compares the data bus width W with the minimum allowable width Wth. When the data bus width W is the minimum allowable width Wth or more (Yes in S25), the controller 2 returns the process to S22.

The controller 2 determines whether the access to the nonvolatile memory 3 succeeds for all the channels CH_1 to CH_N that are training targets (S23). For example, for the write data WD_1 to WD_N, when the controller 2 receives the write completion notification from the nonvolatile memory 3 via all the channels CH_1 to CH_N, the controller 2 determines that the access to all the channels CH_1 to CH_N succeeds (Yes in S23).

When the access to all the channels CH_1 to CH_N succeeds (Yes in S23), the controller 2 determines the current data bus width W as the data bus width that allows the current change rate of the regulator 252 to be the limit threshold value or less. The controller 2 generates the data bus width parameter 41c corresponding to the determined data bus width W on the buffer memory 4 and stores the data bus width parameter 41c in the parameter buffer 41. The controller 2 stores the data bus width parameter 41c in the management information storage area of the nonvolatile memory 3 (S26).

Accordingly, when the write access requests via the channels CH_1 to CH_N are generated in parallel, the memory interface 25 reads and acquires the data bus width parameter 41c from the management information storage area of the nonvolatile memory 3. The memory interface 25 can limit the data bus width for performing the data transfer in parallel to the data bus width W according to the data bus width parameter 41c. Accordingly, the current change rate of the current supplied from the regulator 252 to the power supply line 255 can be reduced to be the limit threshold value or less, and deterioration of the regulator 252 can be reduced. In addition, it is possible to cope with aging degradation of the regulator 252 due to long-term operation of the system, individual differences in chip characteristics, and the like. In addition, it is possible to flexibly cope with the change in the number of channels mounted on the memory interface 25.

Third Embodiment

Figure 10:
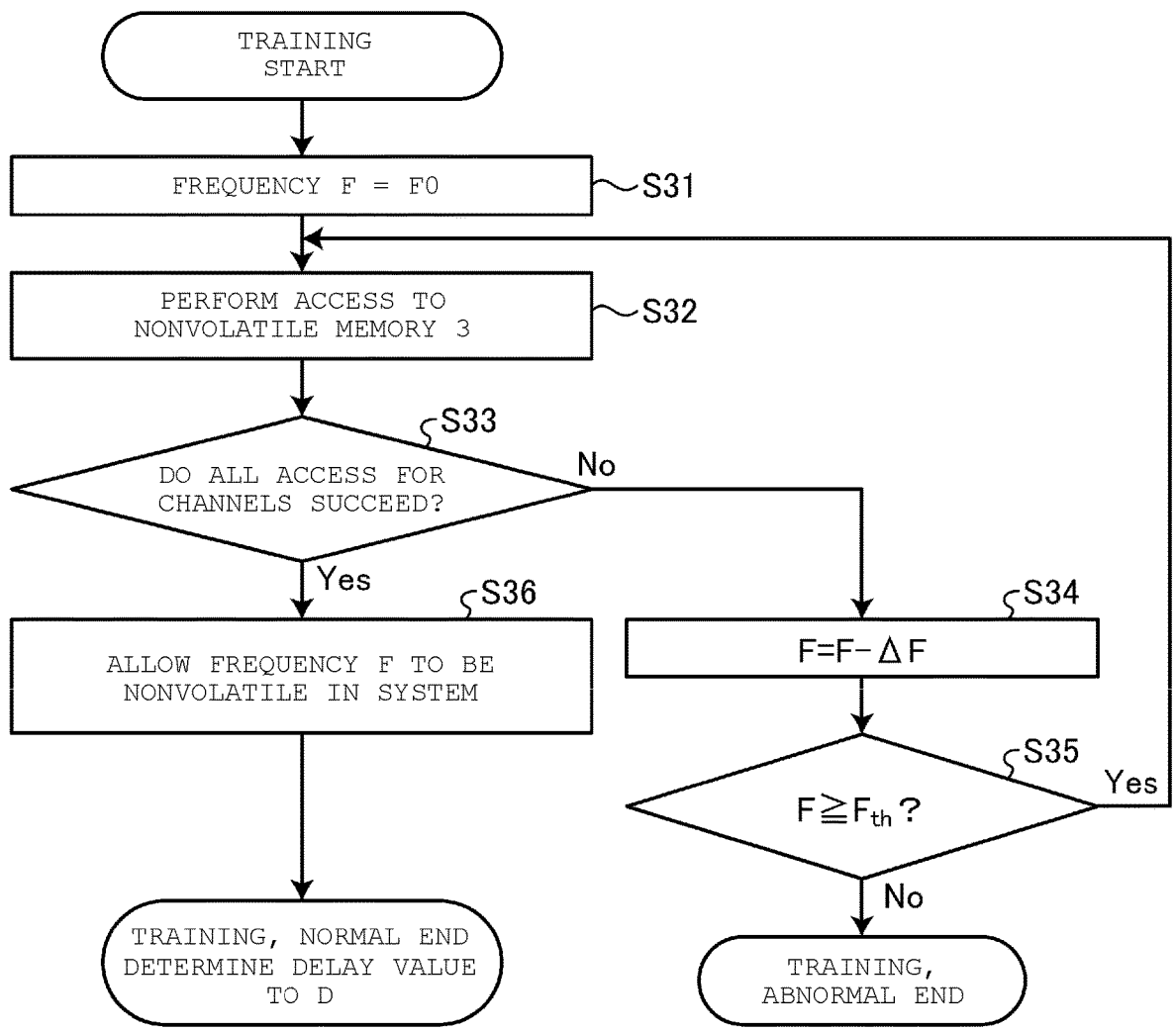
FIG. 10 is a flowchart illustrating training operations of a memory system in a third embodiment.

In addition, as a third embodiment, as illustrated in FIG. 10, the memory system 1 may perform the training on the frequency of each channel CH. FIG. 10 is a flowchart illustrating the training operations of the memory system 1 according to the third embodiment. FIG. 10 illustrates the training of the operation when the memory interface 25 almost simultaneously receives the write data WD_1 to WD_N for the nonvolatile memories 3_1 to 3_N.

It is noted that the training illustrated in FIG. 10 may be performed when the memory system 1 is started, may be performed when the memory system 1 is shipped, or may be performed at any timing when the memory system 1 is in operation.

For example, the controller 2 starts the training illustrated in FIG. 10 when the predetermined condition is satisfied. The predetermined condition may be that the training execution request is received from the host 100 and the frequency parameter 41d is not stored in the parameter buffer 41. In this case, when the frequency parameter 41d is already stored in the parameter buffer 41, the training illustrated in FIG. 10 may be skipped.

Alternatively, the predetermined condition may be receiving the training execution request from the host 100. In this case, when the frequency parameter 41d is already stored in the parameter buffer 41, the controller 2 may erase the frequency parameter 41d on the parameter buffer 41.

Since the configuration of the memory system of the second embodiment is the same as that of the memory system of the first embodiment, the same configurations of the memory system of the second embodiment as those of the memory system of the first embodiment are denoted by the same reference numerals, and the description thereof is omitted.

In the memory system 1, the controller 2 swings the frequency of each channel CH and searches for the frequency that allows the current change rate of the regulator 252 to be the limit threshold value or less. The frequency of each channel CH is a frequency of the clock (for example, read enable signal REZ, data strobe signal DQS, or the like) used for the data signal of each channel CH.

When the training of the frequency is started, the controller 2 sets to the frequency F the initial value F0 (S31). F0 may be 300 (MHz).

The controller 2 accesses the nonvolatile memories 3 of the N nonvolatile memories 3_1 to 3_N by using the frequency F=F0 (S32). For example, for the write data WD_1 to WD_N, the memory interface 25 delays, by the delay value D, the timing of starting the data transfer from the channel interfaces 251_1 to 251_N to the nonvolatile memories 3_1 to 3_N via the channels CH_1 to CH_N. Accordingly, the memory interface 25 transfers the write data WD_1 to WD_N via the channels CH_1 to CH_N in parallel.

The controller 2 determines whether the access to the nonvolatile memory 3 succeeds for all the channels CH_1 to CH_N that are training targets (S33). For example, for the write data WD_1 to WD_N, when the controller 2 receives the write failure notification from the nonvolatile memory 3 via at least one channel CH, the controller 2 determines that there is a channel CH for which the access fails (No in S33).

When there is a channel CH for which the access fails (No in S33), the controller 2 changes the frequency F. For example, the controller 2 sets to the frequency F F−ΔF obtained by subtracting the predetermined value ΔF (for example, 50 (MHz)) from the frequency F (S34).

The controller 2 determines whether the frequency F is larger than the minimum allowable frequency Fth (S35). The minimum allowable frequency Fth may be 150 (MHz).

The controller 2 compares the frequency F with the minimum allowable frequency Fth. When the frequency F is smaller than the minimum allowable frequency Fth (No in S35), the controller 2 abnormally ends the training.

The controller 2 compares the frequency F with the minimum allowable frequency Fth. When the frequency F is the minimum allowable frequency Fth or more (Yes in S35), the controller 2 returns the process to S32.

The controller 2 determines whether the access to the nonvolatile memory 3 succeeds for all the channels CH_1 to CH_N that are training targets (S33). For example, for the write data WD_1 to WD_N, when the controller 2 receives the write completion notification from the nonvolatile memory 3 via all the channels CH_1 to CH_N, the controller 2 determines that the access to all the channels CH_1 to CH_N succeeds (Yes in S33).

When the access to all the channels CH_1 to CH_N succeeds (Yes in S33), the controller 2 determines the current frequency F as the frequency that allows the current change rate of the regulator 252 to be the limit threshold value or less. The controller 2 generates the frequency parameter 41d corresponding to the determined frequency F on the buffer memory 4 and stores the frequency parameter 41d in the parameter buffer 41. The controller 2 writes the frequency parameter 41d in the management information storage area of the nonvolatile memory 3 so as to be nonvolatile (S26).

Accordingly, the memory interface 25 reads and acquires the frequency parameter 41d from the management information storage area of the nonvolatile memory 3 when the write access requests via the channels CH_1 to CH_N are generated in parallel. The memory interface 25 can limit the frequency of the clocks (for example, read enable signal REZ, data strobe signal DQS, or the like) during the data transfer to the frequency F or less according to the frequency parameter 41d. Accordingly, the current change rate of the current supplied from the regulator 252 to the power supply line 255 can be reduced to be the limit threshold value or less, and deterioration of the regulator 252 can be reduced. In addition, it is possible to cope with aging degradation of the regulator 252 due to long-term operation of the system, individual differences in chip characteristics, and the like. In addition, it is possible to flexibly cope with the change in the number of channels mounted on the memory interface 25.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system comprising:
   a plurality of nonvolatile memories; and
   a controller connected to the plurality of nonvolatile memories via a plurality of channels,
   wherein a first nonvolatile memory of the plurality of nonvolatile memories stores a first parameter,
   wherein the controller is configured to acquire the first parameter from the first nonvolatile memory and delay start timing of data transfer to the first nonvolatile memory via a channel among the plurality of channels by a delay value that is based on the first parameter,
   wherein the controller includes:
       a plurality of channel interfaces corresponding to the plurality of channels, each channel interface connected to the corresponding channel;
       a regulator configured to supply a current to the plurality of channel interfaces; and
       a control circuit configured to delay the start timing of the data transfer from the channel interface to a corresponding one of the nonvolatile memories via the channel by the delay value, and wherein the first parameter is based on performance of the regulator,
   wherein the plurality of channel interfaces include a first channel interface and a second channel interface, and
   wherein, when receiving a first start request from the first channel interface and receiving a second start request from the second channel interface, the control circuit issues a first start instruction according to the first start request at a first timing and issues a second start instruction according to the second start request at a second timing delayed from the first timing by the delay value.

2. The memory system according to claim 1, wherein, when access requests involving the data transfer to two or more nonvolatile memories of the plurality of nonvolatile memories via two or more channels among the plurality of channels are generated in parallel, the controller is configured to acquire the first parameter from the nonvolatile memory and delay the start timing of the data transfer to the nonvolatile memory via the channel among the two or more channels by the delay value.

3. The memory system according to claim 1, wherein the delay value according to the first parameter is determined so that a current change rate from the regulator is smaller than a threshold value.

4. The memory system according to claim 1, wherein the delay value according to the first parameter is determined according to a threshold value of a current change rate capable of being followed by a control operation of the regulator.

5. The memory system according to claim 1, wherein each of the plurality of channel interfaces has a buffer memory.

6. The memory system according to claim 1, wherein the controller is configured to access the nonvolatile memory and perform training to determine the first parameter when the memory system is shipped.

7. The memory system according to claim 1, wherein the controller is configured to access the nonvolatile memory and perform training to determine the first parameter when the memory system is started.

8. The memory system according to claim 1, wherein the controller is configured to access the nonvolatile memory and perform training to determine the first parameter at any timing when the memory system is in operation.

9. The memory system according to claim 1,
   wherein the controller is configured to specify the number of parallel channels successfully accessing the nonvolatile memory while changing the number of parallel channels capable of operating in parallel when performing the data transfer from the channel interface to the nonvolatile memory via the channel, generate a second parameter based on the specified number of parallel channels and store the second parameter in the nonvolatile memory, and
   wherein the control circuit is configured to perform the data transfer from the channel interface to the nonvolatile memory via the channel with the number of parallel channels according to the second parameter.

10. The memory system according to claim 9, wherein the controller is configured to access the nonvolatile memory and perform training to determine the second parameter at any timing of when the memory system is shipped, started, or in operation.

11. The memory system according to claim 1,
    wherein the controller is configured to specify a data bus width successfully accessing the nonvolatile memory while changing the data bus width used when performing the data transfer from the channel interface to the nonvolatile memory via the channel, generate a third parameter based on the specified data bus width, and store the third parameter in the nonvolatile memory, and
    wherein the control circuit is configured to perform the data transfer from the channel interface to the nonvolatile memory via the channel with the data bus width according to the third parameter.

12. The memory system according to claim 11, wherein the controller is configured to access the nonvolatile memory and perform training to determine the third parameter at any timing of when the memory system is shipped, started, or in operation.

13. The memory system according to claim 1,
    wherein the controller is configured to specify a frequency successfully accessing the nonvolatile memory while changing the frequency when performing the data transfer from the channel interface to the nonvolatile memory via the channel, generate a fourth parameter based on the specified frequency, and store the fourth parameter in the nonvolatile memory, and wherein the control circuit is configured to operate at a frequency according to the fourth parameter and to perform the data transfer from the channel interface to the nonvolatile memory via the channel.

14. The memory system according to claim 13, wherein the controller is configured to access the nonvolatile memory and perform training to determine the fourth parameter at any timing of when the memory system is shipped, started, or in operation.

15. A memory system, comprising:

a plurality of nonvolatile memories; and a controller connected to the plurality of nonvolatile memories via a plurality of channels, wherein a first nonvolatile memory of the plurality of nonvolatile memories stores a first parameter, wherein the controller is configured to acquire the first parameter from the first nonvolatile memory and delay start timing of data transfer to the first nonvolatile memory via a channel among the plurality of channels by a delay value that is based on the first parameter, wherein the controller includes:

a plurality of channel interfaces corresponding to the plurality of channels, each channel interface connected to the corresponding channel;

a regulator configured to supply a current to the plurality of channel interfaces; and a control circuit configured to delay the start timing of the data transfer from the channel interface to a corresponding one of the nonvolatile memories via the channel by the delay value, and wherein the first parameter is based on performance of the regulator, and wherein the control circuit includes:

a first-in-first-out (FIFO) circuit configured to be input with a start request from the channel interface;

an issue circuit configured to issue a first start instruction to the channel interface based on the first start request fetched from the FIFO circuit; and a counter configured to start a counting operation according to issuance of a start instruction by the issue circuit and to count up to the delay value, and wherein the issue circuit is configured to issue a second start instruction according to a second start request next fetched from a top of the FIFO circuit when the counter counts up to the delay value, to the channel interface.

16. A memory system, comprising:

a plurality of nonvolatile memories; and a controller connected to the plurality of nonvolatile memories via a plurality of channels, wherein a first nonvolatile memory of the plurality of nonvolatile memories stores a first parameter, wherein the controller is configured to acquire the first parameter from the first nonvolatile memory and delay start timing of data transfer to the first nonvolatile memory via a channel among the plurality of channels by a delay value that is based on the first parameter, wherein the controller includes:

a plurality of channel interfaces corresponding to the plurality of channels, each channel interface connected to the corresponding channel;

a regulator configured to supply a current to the plurality of channel interfaces; and a control circuit configured to delay the start timing of the data transfer from the channel interface to a corresponding one of the nonvolatile memories via the channel by the delay value, and wherein the first parameter is based on performance of the regulator, and wherein the controller is configured to specify the delay value successfully accessing the nonvolatile memory while changing the delay value shifting the start timing of the data transfer from the channel interface to the nonvolatile memory via the channel, generate the first parameter based on the specified delay value, and store the first parameter in the nonvolatile memory.

* * * * *